May 4, 1965 R. E. MAPLES 3,181,759

PUNCHED TAPE DRIVING MECHANISM

Filed July 24, 1963 3 Sheets-Sheet 1

Inventor:
Richard E. Maples
Dradolph, Love & Rogers
Attorneys

May 4, 1965 R. E. MAPLES 3,181,759

PUNCHED TAPE DRIVING MECHANISM

Filed July 24, 1963 3 Sheets-Sheet 2

Inventor:
Richard E. Maples
Gradolph, Love & Rogers
Attorneys

May 4, 1965 R. E. MAPLES 3,181,759

PUNCHED TAPE DRIVING MECHANISM

Filed July 24, 1963 3 Sheets-Sheet 3

Inventor:
Richard E. Maples
Gradolph, Love & Rogers
Attorneys

United States Patent Office 3,181,759
Patented May 4, 1965

3,181,759

PUNCHED TAPE DRIVING MECHANISM

Richard E. Maples, Chicago, Ill., assignor to Victor Comptometer Corporation, Chicago, Ill., a corporation of Illinois

Filed July 24, 1963, Ser. No. 297,394
4 Claims. (Cl. 226—51)

This invention relates in general to an improved tape feeding mechanism, and more particularly to a tape feeding mechanism in which the drive for feeding the tape is continuously operated and intermittently engaged with the tape indexing device for moving the tape. The mechanism of this invention is adapted for use with both tape perforating and tape reading mechanisms.

Tape feeding and perforating mechanisms are usually employed for perforating a tape to record information transmitted in the form of electrical signals. The signals may be supplied from any one of a number of different types of equipment, such as a computer. Since the speed at which such equipment transmits signals has been increased considerably in recent years, it is also desirable to increase the speed at which the tape can be indexed and perforated in order to increase the total informational capacity of the system.

Increasing the speed of tape movement becomes a problem, however, since the tape must be stopped each time it is perforated and then indexed to a successive position where it is again perforated. The apparatus for moving the tape is therefore usually started and stopped in sequence with the punch or reader cycle. Since the drive or moving apparatus has considerable inertia, the need to start and stop such apparatus renders high speed operation difficult to achieve.

Further, it is often desirable to index or move the tape backward in the event an error is discovered, so that the tape may be marked at the place of error for either correcting the error or indicating its existence. Present-day tape reading or perforating mechanisms do not usually employ an electromechanical arrangement for moving or indexing the tape in a backward direction. Such mechanisms require that the tape be turned back manually so that the tape may be punched with a pattern of code obliterating perforations that blanket out the original perforations and data conveyed thereby.

In many of the tape readers in use at this time, the tape is fed continuously and the lights and photo sensitive cells of the reader sense the existence and values of the perforations to transmit the data or information coded by them for subsequent use. Such tape readers may operate at very high, steady or continuous speeds and only a fraction of the time it takes for the tape to be indexed from one code is efficiently available for sensing the coded data punched into the tape. A comparison of a tape reader made in accordance with this invention and a continuously fed tape on a conventional reader wherein the same number of codes are exposed for reading per each time interval or second shows a remarkable advantage to the reader of this invention. With the tape feeding mechanism of this invention only 90° of each cycle is used to transport the tape and 270° of the cycle is available for exposure of the tape to the scanning light and photocell. Under the circumstances of the continuously fed tape at the same time for a whole cycle, only 72° of the cycle is efficiently available for exposure of the tape to the scanning light and cell. It can be appreciated that nearly four times as much of the cycle is utilizable for tape reading than with the prior devices, and that the reading accuracy is commensurably improved.

It is surmised that this advantage stems from the fact that with the continuously fed tape and the continuous movement of the code containing perforations past the scanning light and cell those portions of the exposure at the beginning and end of the exposure time are of relatively less value because of the lack of light intensity which leads to unreliability of accuracy. Where the tape is stopped for reading this difficulty is overcome and a very much greater angular value of the machine cycle is available for reading with a corresponding improvement in accuracy.

It is therefore a primary object of the present invention to provide an improved high speed tape feeding mechanism which may be used for tape perforating apparatus and for tape reading apparatus with improved accuracy in tape perforating and tape reading.

Another object is to provide an improved tape feed mechanism for indexing a tape in either of two directions.

Another object is to provide a new and improved tape feeding mechanism of the intermittent tape feed type wherein the weight and inertia of that part of the mechanism, which is stopped and started is held to a minimum.

Briefly, the tape feeding mechanism of the present invention incorporates a continuously operating drive for engagement with one or the other of a pair of tape indexing pawls. The pawls are selectively pivoted by a single clutch arrangement for engagement with ratchets on energization of corresponding electromagnets. The ratchets are moved in opposite directions for indexing the tape forwardly or backwardly and only the inertial resistance of the pawl and clutch arrangement need be overcome for controlling the tape movement.

The above and other objects of the present invention will become apparent upon examination of the following specification and claims, together with the drawings, wherein FIG. 1 is a plan view taken perpendicularly to the top surface of the tape feeding mechanism and an associated tape perforating assembly with portions of the tape broken away;

The tape feeding mechanism is shown as used with a tape perforating assembly for the purpose of illustrating it in a typical and useful environment. It is to be understood, however, that the feeding mechanism is equally useful in connection with a tape reader.

Figure 1:
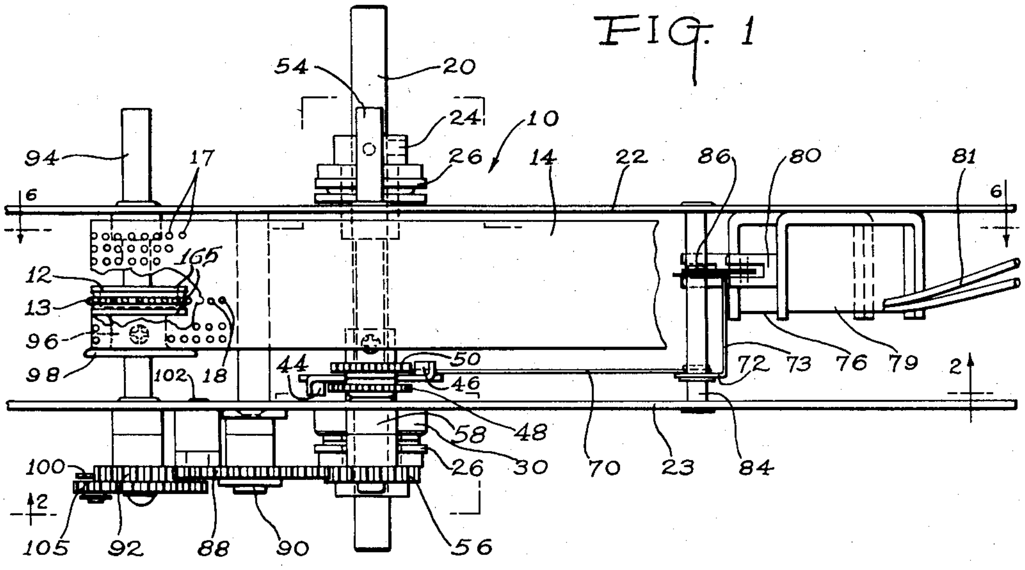

In FIG. 1, a tape feed and perforating assembly is indicated by the reference character 10. It comprises a driving sprocket wheel 12 having teeth 13 for indexing a tape 14 from a supply reel (not shown) past a perforating station 16. If desired, a plate may be supplied for supporting the tape before it engages with sprocket wheel 12. The tape is perforated at the station 16 with perforations 17 in accordance with the information which is supplied for registration upon the tape.

A feed hole 18 of smaller diameter than perforations 17 and of a size adapted properly to engage the sprocket teeth 13 is also perforated in the tape at the station 16 for each indexing operation to enable the tape properly to be positioned and indexed in either direction in response to the rotation of the sprocket wheel 12. In order to perforate the tape it must be stopped after each indexing operation, and it is one of the advantages of this invention that the number of parts which must be started and stopped for each indexing and perforating function of the assembly 10 is held to a minimum.

Figure 2:
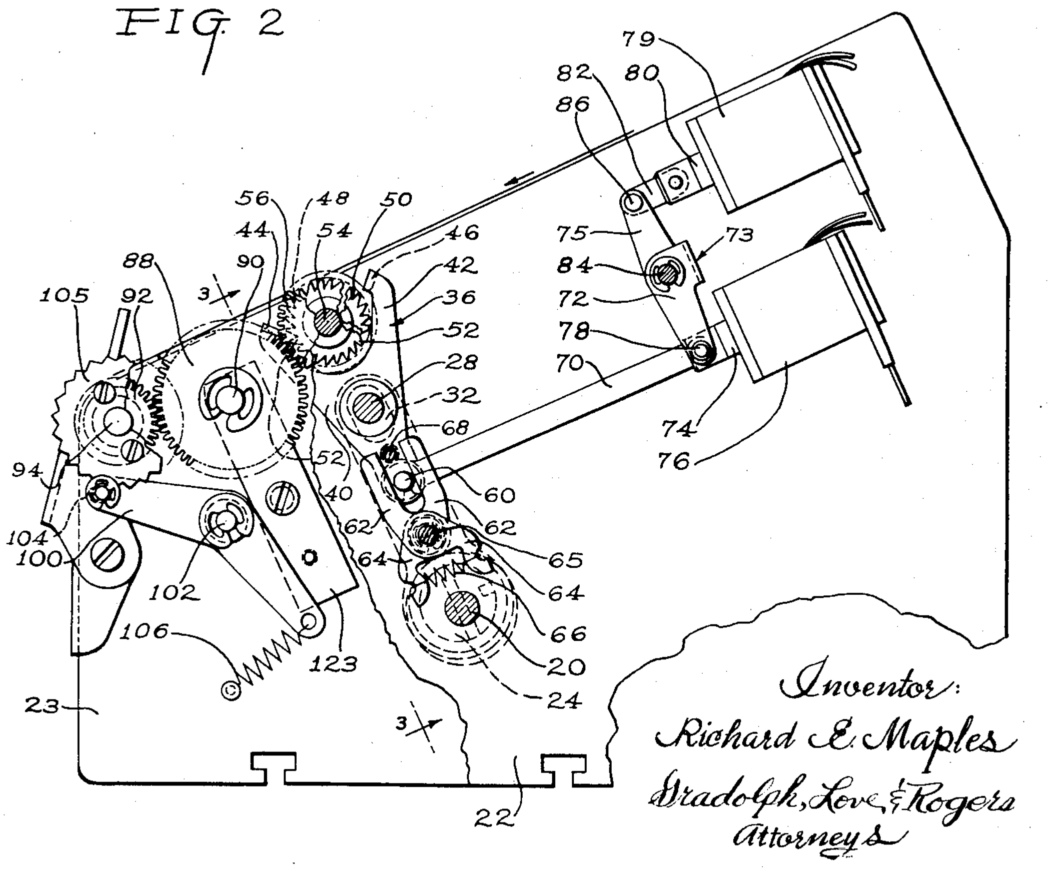
FIG. 2 is a sectional view taken along the irregular line 2—2 of FIG. 1, looking in the direction of the arrows.
Figures 3, 4, 5:
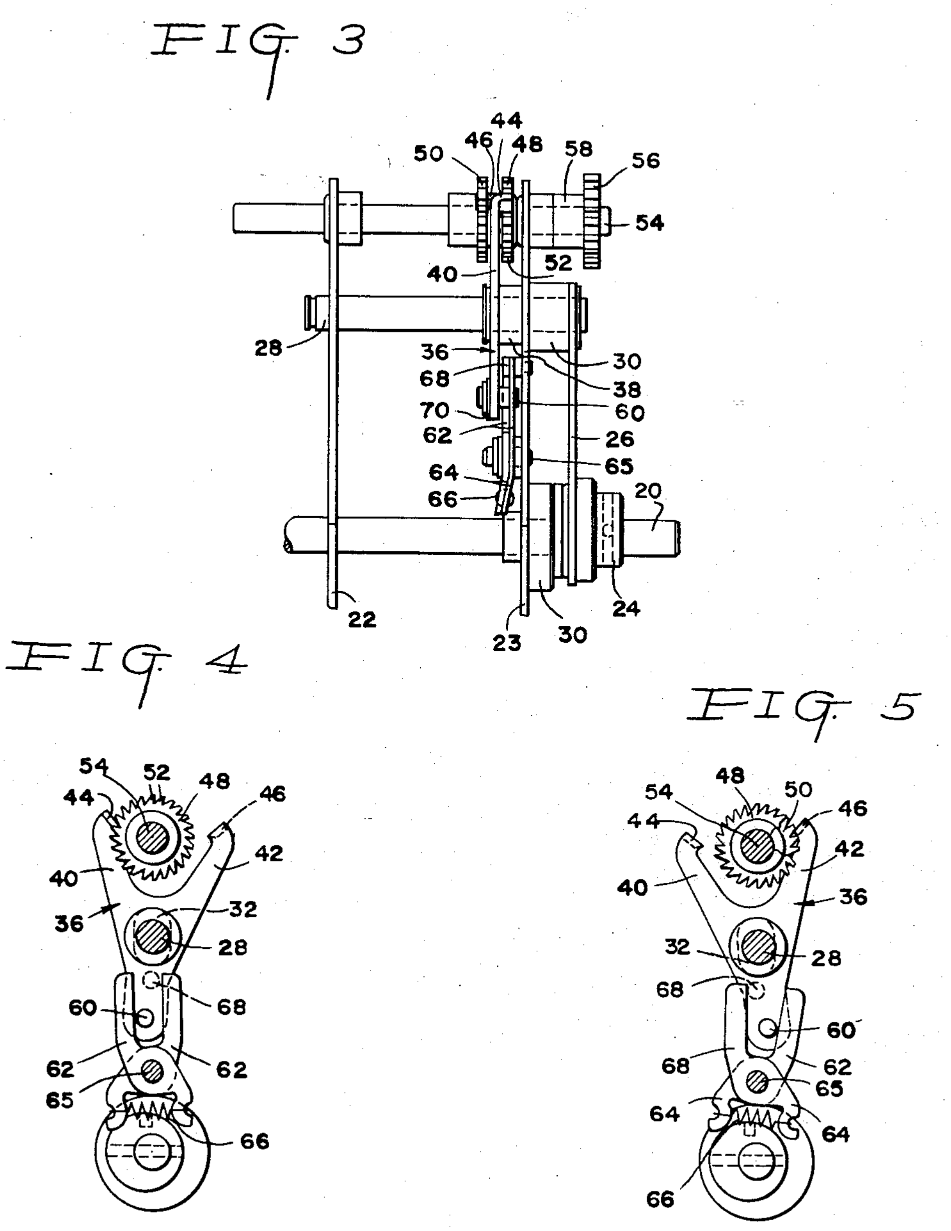
FIG. 3 is a sectional view taken along the line 3—3 of FIG. 2, looking in the direction of the arrows.
FIG. 4 illustrates the manner in which one pawl is engaged with its ratchet for indexing the tape in a forward direction.
FIG. 5 illustrates the manner in which the other pawl is engaged with its ratchet to index the tape in a backward direction.
Figures 6, 7, 8:
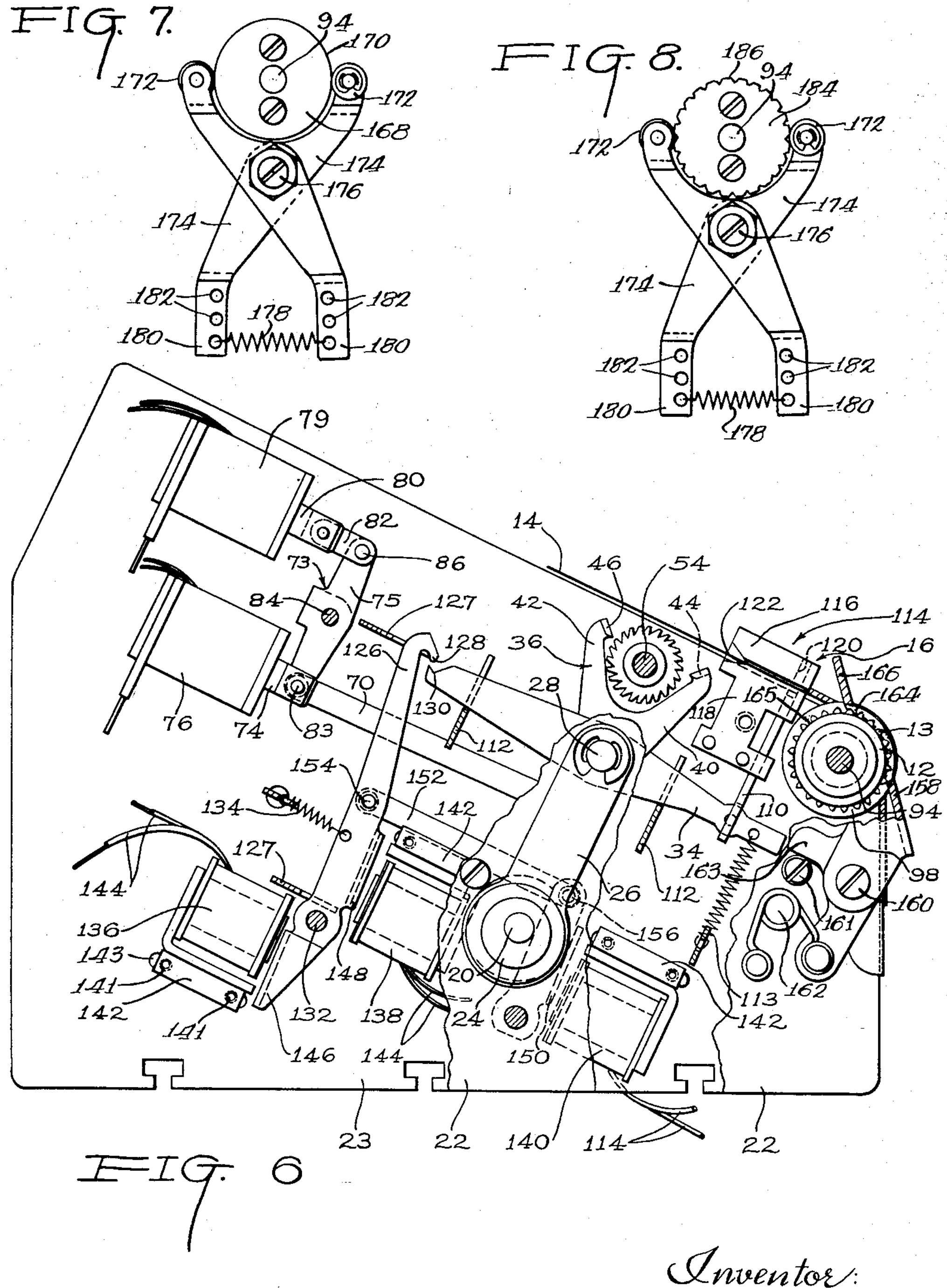
FIG. 6 is a side view illustrating the disposition of the tape perforating punches and the arrangement for latching the same.
FIG. 7 is a view of a modified form of aligner brake used on a high speed reader.
FIG. 8 is a similar view showing still another form of aligner brake.

The sprocket wheel 12 is indexed from a continuously driven shaft 20 extending between and journaled in a pair of side plates 22 and 23. The shaft 20, driven from a source (not shown), has an eccentric connection 24, as best seen in FIGS. 2, 3, and 6, to an arm 26 for reciprocating the arm 26 along a substantially vertical path (considered with reference to the top of the assembly 10). The arm 26 carries a shaft 28 adjacent its upper end and is suitably spaced from the side plate 23 by spacers 30 on the drive shaft 20 and shaft 28. The shaft 28 extends through suitable guide slots 32 in the side plates 22 and 23 (FIG. 2), and it pivotally carries a plurality of spaced apart rocking beams 34 between the plates 22 and 23, as seen in FIG. 6, and a Y-shaped yoke member 36 adjacent the inner face of the side plate 23, as best seen in FIGS. 2 and 3.

The yoke member 36 is operated to index the tape 14 forward or backward. It is spaced from the side plate 23 by a suitable spacer 38 carried on the shaft 28, and it has a pair of arms 40 and 42 provided with pawls 44 and 46, respectively, at the ends thereof projecting in opposite directions.

The pawls 44 and 46 are arranged to straddle a pair of coaxially mounted spaced ratchets 48 and 50 with pawl 44 adapted to engage between the teeth 52 of ratchet 48 and pawl 46 adapted to engage between the teeth of ratchet 50. The ratchets 48 and 50 are fixed on a shaft 54 journaled in the side plates and adapted to rotate with the ratchets. A gear 56 is carried on the end of the shaft 54 external of side plate 23 and suitably spaced therefrom by a spacer 58.

The yoke member 36 carries a pin 60 adjacent its lower end and below the shaft 28. The pin 60 is engaged between legs 62 of a pair of scissor members 64. The scissor members 64 are pivotally carried on a pin 65 extending inwardly from the side plate 23. A spring 66 is provided for biasing the scissor legs 62 closed. A stop pin 68 is provided on the side plate 23 and it extends between the legs 62 above the pin 60. FIGS. 2, 4, and 5 show the pin 68 and shafts 28 and 54 to be vertically aligned. The spring 66 normally holds the scissor legs in a close embrace of the pins 60 and 68 to bring the pin 60 into the same alignment and to hold the pawls 44 and 46 out of engagement with the ratchet wheels 48 and 50.

The yoke member 36 is adapted to be rocked or pivoted in either direction about the shaft 28 by a link 70 having one end connected to the member 36 on the pin 60. The other end of the link is pivotally connected at 78 to an offset arm 72 of a bell crank 73 pivoted at its midpoint on a rod 84 extending between the side plates 22 and 23. A second arm 75 of the bell crank is pivotally connected at its opposite ends to armatures 74 and 80 of electromagnets 76 and 79, respectively. The connection to the armature 74 is by the pin 83, while that to the armature 80 is by the pin 86 and short link 82.

When the electromagnet 79 is energized, the bell crank 73 is pivoted in the clockwise direction (FIG. 2) to move the link 70 leftwardly and pivot the yoke member 36 in the clockwise direction to bring the pawl 44 into position to engage the teeth of the ratchet wheel upon downward movement of the member 36 (FIG. 4) to index the tape 14 one position, in the distance between adjacent holes 18, in the forward direction. If it is desired to move the tape 14 backwardly to indicate a correction in data perforations 17 or to reread a portion of the tape, the electromagnet 76 is energized and the link 70 is moved to the right (FIG. 2) to pivot the yoke arm 36 in the counterclockwise direction to bring the pawl 46 into position to engage the ratchet wheel 50 upon downward movement of the member 36, thereby to retract the tape one position.

It should be observed from FIGS. 4 and 5 that the pin 60 moves one or the other of the scissor legs 62 during pivoting of the yoke member, while the other leg remains engaged with the pin 68. Upon deenergization of both electromagnets, the spring 66 will move the legs together and the yoke arm 36 will be pivoted to its neutral or normal position (FIG. 2). Thus a simple clutch arrangement for engaging the pawls 44 and 46 with the ratchets 48 or 50 and for restoring the drive to neutral position is provided.

During continued operation of either perforating or reading a tape 14, the forward advancing electromagnet is continuously energized, but the tape 14 is moved only upon a portion of the downward stroke of the yoke member 36, which is equal to 90° of a revolution of the drive shaft 20. The remaining portion of the revolution is upward stroke and dwell at both ends of the stroke. Upon the upward stroke of the member 36 the pawl 44 rides over the back of the teeth without moving the ratchet wheel 48. Upon the downward movement of the yoke member 36, the pawl 44 engages the teeth and indexes the ratchet wheel 48 and shaft 54. This same function is employed with the pawl 46 and ratchet wheel 50 for backward or retracting movement of the tape 14.

In either event, the ratchets 48 and 50 therefore serve to rotate the shaft 54 either for tape feeding or retracting, depending on which is moved and the shaft 54 in turn rotates the gear 56. The gear 56 is adapted to transmit its movement through an idler gear 88 mounted on a stub shaft 90 carried by the side plate 23. The idler gear 88 in turn transmits its movement to a gear 92 carried on a shaft 94 which also carries the sprocket wheel 12. The sprocket wheel 12 is provided with a hub 96 having a projecting flange 98 of a diameter slightly larger than the sprocket wheel and against the inner face of which an edge of the tape is engaged for aligning and guiding the tape at least at the outset of the feeding operation.

A detent arm 100 is pivotally mounted on a pin 102 carried by the side plate 23 between the gears 88 and 92. The arm 100 carries a detent 104 at one end which is biased into engagement with a serrated wheel 105 by a spring 106. The spring 106 is engaged between the other end of arm 100 and the plate 23, while the wheel 105 is mounted on the end of shaft 94. This insures that the gear 92 must move a distance sufficient for detent 104 to clear the adjacent serration and prevents overtravel of the sprocket wheel 12 by engaging against the succeeding serration on each indexing operation.

The rocking beams 34 are spaced apart on pin 28 by distances corresponding to the positions in which it is desired to perforate the tape with the data perforations 17 and feed holes 18. As best seen in FIG. 6, each beam is pivotally engaged with a punch bar 110 adjacent one end thereof and is suitably guided along opposite ends by guide members 112 during reciprocation of the shaft 28. A spring 113 connected to each rocking beam adjacent the connection to the punch bar 110 normally restains the beam against a punching movement during reciprocation of the arm 26.

The rocking beams are adapted to reciprocate the punch bars 110 through a punch block assembly 114 at the punching station 16. The punch block assembly 114 comprises an upper member 116 and a lower member 118 having suitable passageways 120 through which the punch bars 110 pass. The upper and lower members 114 and 116 also form a guide passageway 122 through which the tape 14 passes so that it may be punched by appropriate ones of the punch bars 110. A bracket 123, seen in FIG. 2, mounts the punch block assembly on the side plates.

As the shaft 20 rotates, the eccentric connection 24 moves the arm 26 upwardly and downwardly, thus carrying the rocking beams 34 and the yoke member 36 therewith. As the beams 34 moves upwardly, the punch bars 110 tend to move through the punch block assembly toward engagement with the tape located in the passageway 122 in the block assembly 114, but the springs 113 normally restrain the right ends of the beams 34 and the punch bars 110 from moving toward the tape.

To enable the punch bars 110 to perforate the tape 14, each rocking beam is associated with a generally vertically disposed pivotally mounted latch 126 suitably guided adjacent opposite ends by guide members 127. A depending finger 128 at the upper end of the latch is adapted to engage a recess 130 at the end of the rocking beam opposite the punch bar 110. When the latch finger 128 is engaged with the rocking beam recess 130, the beam on the upward stroke of the arm 26 pivots about the connection between the finger 128 and recess 130 to drive its punch bar through the tape. The down stroke of the arm 26 and the spring 113 quickly withdraw the punch bar from the tape.

Each latch is pivotally mounted on a pin 132 adjacent its lower end, and a spring 134 normally holds the latch out of engagement with the rocking beam. Since as many as eight perforations 17 may be provided in the tape in addition to the feed hole 18, and since the space across the tape is limited, each latch is adapted to be operated by one of a group of electromagnets, three of which, 136, 138, and 140, are shown, through different types of linkages, the electromagnets being variously positioned in the assembly 10.

The electromagnets 136, 138, and 140 are adjustably mounted in different positions within the assembly by means of brackets 142 and screws 141 extending through slots 143 in the side plates 22 and 23, and as many electromagnets as necessary to accommodate the rocking beams used for perforations 17 are provided. The electromagnets are adapted to be energized over leads 144 from a source such as a computer, which transmits information to be registered in code in the tape by means of electrical signals. Since the feed holes 18 are necessarily provided for each indexing operation, the latch 126 associated with the rocking beam controlling the feed hole perforating punch is maintained continuously pivoted clockwise about the pin 132 so that its finger 128 engages its rocking beam on each upward stroke of the arm 26. The positioning of this latch is maintained by an appropriate stop member (not shown) which acts against the bias of spring 134, if it is desired to save the space allocated to a magnet.

In order to accommodate actuation from the different electromagnets 136, 138, and 140, the latches are provided with armature portions 146 and 148 adapted to be attracted by the electromagnets 136 and 138, respectively. Thus, each of these magnets, when energized, pivots its associated latch 126 clockwise about the pin 132. If magnet 140 is used to actuate the latch, its pivotally mounted armature 150 is pivotally connected to a link 152 at 156 which is in turn pivotally connected to the latch 126 by pin 154.

Thus, the latches may each be pivoted clockwise about the pin 132 on energization of the appropriate electromagnet 136, 138, or 140. As the rocking beam 34 moves upwardly, it engages the pivoted latch and thereafter pivotal movement of the beam is in the counterclockwise direction about the connection between the latch finger 128 and recess 130 to the punch bar 110 through the tape.

The assembly 10 is prepared for operation by first threading a tape through the passage 122 between the upper and lower blocks 116 and 118 at the perforating station 16 and then passing the tape over the sprocket wheel 12. One edge of the tape 14 is held against the aligning flange 98 so that the tape is properly oriented with respect to the teeth 13 on the sprocket wheel 12, and the subsequently formed feed holes 18 will maintain this initial positioning. The tape is then forced down upon the sprocket wheel so that the teeth 13 perforate the tape in alignment with the feed holes 18. This preferably is done by a shoe 158 located between the side plates on a pivot pin 160 and urged into tape perforating position by a grass hopper type spring 162 (FIG. 6). The shoe 158 is formed with a slot 164 to accommodate the teeth 13 of the sprocket wheel 12, and it is held from shoulders 165 on either side of the sprocket wheel teeth 10 by an integral projection 163 in engagement with an eccentrically adjustable stop 161. The central curved portion of the shoe is thus spaced from the shoulders 165 a distance sufficient to permit the free passage of the tape as the shoe 158 remains in its FIG. 6 position during normal operation of the device. A projecting finger grip 166 permits the shoe 158 to be swung away from the sprocket wheel so that the tape 14 may be threaded therebetween.

The appropriate electrical connections are extended and the drive apparatus operated to rotate shaft 20 and reciprocate arm 26, shaft 28, the rocking beams 34, punches 110, and the yoke member 36. Thereafter, in response to an electrical signal, the electromagnet 79 retracts its plunger arm 80 to pivot the crank 82 and shift the link 70 to the right (FIG. 6).

This pivots the yoke member 36 to bring pawl 44 into engagement with ratchet 48 as the yoke member 36 moves downward in response to the reciprocating movement of the shaft 28. The scissor legs 62 are, of course, pivoted about the pin 65 in the opposite direction and separate when one leg engages the stop pin 68.

Thus, the ratchet wheel 48 is moved until the pawl 44 becomes disengaged from between the ratchet teeth. The ratchet 48 transmits its movement through the gears 56, 88, and 92 to the sprocket wheel 12, and the sprocket wheel indexes the tape 14 forward by an amount corresponding to the distance between the serrations of wheel 105.

The electromagnet 79 will ordinarily remain energized as long as the tape is being indexed in the forward direction. Therefore, on the succeeding upward movement of the yoke member 36, the latter will remain pivoted but the pawl 44 will ride over the ratchet teeth and past the ratchet 48 as the yoke member 36 pivots slightly against the force exerted by the electromagnet 79. On the succeeding downward stroke of the yoke 36, the pawl again engages ratchet 48 and indexes the tape forward. In this manner the tape is continuously indexed forward while the detent 104 and wheel 105 insure it moves only that distance corresponding to the space feed holes 18 and is properly stopped between indexing operations.

The punch for perforating the tape feed holes 18 is also continuously reciprocated along with the other punches 110 and the rocking beams 34. The latch for engaging the beam 34 associated with the feed holes 18 is maintained in a position for engaging the beam on each upward movement of the beam. None, or one or more of the magnets 136, 138, and 140 associated with the rocking beams 34, may be periodically energized from an associated source in accordance with information to be stored on the tape 14. The latches 126 associated with the energized magnets 136, 138, and 140 are therefore also positioned for engagement with the beam 34 as previously explained.

If the rocking beam 34 is moving downwardly before the latch 126 is properly positioned, the latch is simply rotated out of the path of the beam to enable passage of the beam past the latch, but on the succeeding upward stroke the finger 128 is projected into the path of the recess 130. During the upward stroke the tape is stopped since the pawls 44 and 46 are not engaged for moving ratchets 48 and 50. The punches 110 will therefore be carried upward through the punch block assembly 114 to perforate the tape 14 accordingly. When the rocking beams 34 are retracted downwardly, the latches 126 will disengage from the cross beams 34 and the tape 14 will now be indexed forwardly.

If it is desired to move the tape backward, the electromagnet 76 is energized and the electromagnet 79 deenergized. The electromagnet 76 retracts the arm 70 to pivot the yoke member 36 to the FIG. 5 position to bring the pawl 46 into engagement with the ratchet 50 during the downward stroke of the yoke member 36. The shaft 54 and gear 56 will therefore be rotated in the opposite direction from that achieved by pawl 44 and ratchet 48. The sprocket wheel 12 will therefore likewise be stepped in the opposite direction to index the tape in a backward direction.

In using this tape feeding mechanism with a tape reader, a reader assembly of light sources and photoelectric cells is substituted for the punch station 16. The tape 14 is stopped for 270° of the rotation of the drive shaft 20 with the data perforations 17 aligned with the light sources and photo cells. This permits a relatively longer time than previously afforded accurately to sense and transmit the data or information represented by the perforations 17. The tape 14 is indexed forwardly by energization of the electromagnet 79 and should it be desired to reread a portion of the tape, the electromagnet 76 is energized to retract the tape as previously described for rerunning through the reader.

The serrated wheel 105 acts as an aligner or brake on advancement of the tape 14 and is particularly useful in the perforating operation where it is essential that the tape be stopped after a finite longitudinal travel, the extent of which is dictated by the conventions used in industry. The working or downward stroke of either of the pawls 44 and 46 is such that the tape is advanced or retracted, through the intermediate gearing 56, 88 and 92 and sprocket wheel 12, the aforementioned finite distance. The serrated wheel 105 is formed so that its peripheral depressions coincide with this longitudinal finite distance of tape movement to prevent overtravel due to inertia of the tape feed components. It should be noted that the relatively deep depressions between the teeth of the wheel 105 create a static inertia condition to be overcome at the onset of each tape advancing or retracting step. While this static inertia might well be tolerated during a tape perforating operation, it is to be prevented as much as possible during tape reading. FIGS. 7 and 8 illustrate two modifications of the longitudinally aligning brake for the tape feed wheel 12 which can be used with both tape readers and perforators and which present minimum starting inertia.

FIG. 7 shows a plain circular disc 168 fixed to the outer end of the shaft 94 and against periphery 170 of which are engaged two very much smaller braking rollers 172. The braking rollers are carried on the upper ends of crossed scissor arms 174 which are pivotally mounted on the side plate 23 by a pivot bolt 176. The braking rollers 172 are biased against the periphery 170 of the disc 168 and toward each other by a tension spring 178 extending between the arms 174 at a position on the side of the pivot 176 opposite the braking rollers 172. At the end of the tape advancing or retracting movement imparted by either of the pawls 44 or 46 the friction of the rollers 172 on their own axles, the friction of the rollers 172 on the periphery 170 of the disc 168, and the inherent friction in the system between the pawls 44 and 46 and the sprocket wheel 12 will cumulate to prevent overtravel of the sprocket wheel and the tape.

Lower ends 180 of the arms 174 are provided with a series of apertures 182 to which the hooked ends of the spring 178 may be connected so as to accommodate varying and adjusting the pressure with which the rollers 172 engage the periphery of the disc 168. The spring 178 is shown in the position of maximum force application.

The braking rollers 172 are so positioned against the periphery of the disc 168 that the positive lines of force which they exert opposite each other are exerted through the axis of the sprocket shaft 94 so that there are no uneven or angularly exerted forces exerted against the disc 168 which would result in a greater or lesser aligning and braking force when the tape 14 is being advanced or retracted.

In FIG. 8 there is shown the second modification of the longitudinal tape aligning and braking mechanism. In this form there is mounted on the outer end of the sprocket wheel shaft 94 an aligning and braking disc 184 which has a slightly dimpled or serrated periphery 186, the low points of which coincide with the position of the shaft 94 at the stop position of the sprocket wheel 12 and when the braking rollers 172 are engaged in the low portions of the disc periphery. It should be noted that these low and high peripheral portions are so oriented that the two rollers 172 will engage force opposed high or low portions simultaneously so that the forces which they exert will be applied symmetrically to the disc 184 and shaft 94 so that they will be uniform regardless of whether the tape 14 is being advanced or retracted.

From the foregoing description it is clear that the objectives which were claimed for this invention in the beginning of this specification are attained by the disclosed structure.

While a preferred embodiment of the present invention has been shown and described, it will be apparent that numerous modifications and variations thereof may be made therein without departing from the underlying principles of the invention. It is therefore desired, by the following claims, to include within the scope of the invention all such variations and modifications by which substantially the results of this invention may be obtained through the use of substantially the same or equivalent means.

What is claimed as new and desired to be secured by United States Letters Patent is:

1. In a tape feeding means having a tape engaging sprocket wheel, the combination comprising a pair of ratchet wheels connected to the sprocket wheel for moving a tape, a first pawl and a second pawl arranged so that said first pawl is adapted to engage one of said ratchet wheels for rotation of the sprocket wheel in a tape advancing direction and said second pawl is adapted to engage the other of said ratchet wheels for rotation of the sprocket wheel in a tape retracting direction, a common carrier for said pawls, reciprocable means pivotally mounting said carrier, drive means connected to said carrier mounting means for continuously reciprocating said mounting means, said carrier and said pawls, means engageable with said carrier normally biasing said carrier against pivotal movement and said pawls out of engagement with said ratchet wheel, and selectively operable means connected to said carrier for pivoting the latter about said reciprocable supporting means for moving said first pawl into engagement with its ratchet wheel or for moving said second pawl into engagement with its ratchet wheel during movement of said carrier and said pawls in one of said reciprocating directions, whereby the sprocket wheel is operated to move the tape in the advancing direction or in the retracting direction.

2. The combination claimed in claim 1, wherein said means for normally biasing said pawl carrier against pivotal movement comprises a pair of pivotable scissor leg elements engageable with said carrier, and means for biasing said legs in closed direction to restrain said carrier against pivotal movement.

3. In a tape feeding mechanism having a sprocket wheel adapted to engage successive feed holes in a tape for moving the tape either in an advancing or a retracting direction, the combination comprising, a Y-shaped yoke member having a pawl at the end of each upwardly extending arm, means for pivotally supporting said yoke member, drive means for continuously reciprocating said yoke member and pivotal support along a straight line, ratchet means straddled by said pawls, means biasing said yoke member to a neutral position wherein neither pawl engages said ratchet means during reciprocation of said yoke member and pivotal support, a link pivotally connected to said yoke member for pivoting said yoke member against the force of said biasing means in opposite directions to engage one or the other of said pawls with said ratchet means while said pawls are reciprocated in one direction along said straight line to operate said ratchet means in a direction corresponding to the engaging pawl, and means connecting said ratchet means with the sprocket wheel for moving the sprocket wheel in response to the rotation of said ratchet means thereby to move said tape in either an advancing or a retracting direction dependent on the direction of operation of said ratchet means.

4. In a tape feeding mechanism having a sprocket wheel adapted to engage successive feed holes in a tape for moving said tape either in an advancing or retracting direction, the combination comprising, a continuously operated drive shaft, a pair of pivotally supported scissor arms, a spring for biasing said scissor arms closed, a Y-shaped yoke member having a pawl at the end of each upwardly extending arm, a pair of pins one of which is adapted to move with said yoke member and the other of which is fixed with both pins extending between said scissor arms, an arm adapted to be reciprocated along a vertical axis by said drive shaft, a yoke member carrying shaft carried by said arm and pivotally mounting said yoke member for reciprocation therewith, said scissor arms when closed restraining said yoke member against pivotal movement, a pair of ratchets mounted on a common shaft for rotation therewith and straddled by said pawls, a pair of electromagnets, a link controlled by both electromagnets and connected to said yoke member for pivoting said yoke member in opposite directions for engaging one or the other of said pawls with one or the other of said ratchets while said yoke member is reciprocated in one direction, thereby to rotate the engaged ratchet and to separate said scissor arms, and means for moving said sprocket wheel in a corresponding direction in response to the rotation of each ratchet by its engaged pawl for moving said tape in either an advancing or a retracting direction.

References Cited by the Examiner

UNITED STATES PATENTS

| | | | |
|---|---|---|---|
| 1,156,037 | 10/15 | Quigley | 226—53 |
| 2,644,562 | 7/53 | Pettus | 226—76 X |
| 2,769,641 | 11/56 | Brown | 74—157 X |
| 2,911,905 | 11/59 | Marvin et al. | 226—11 X |
| 2,933,931 | 4/60 | Lisinski | 74—157 X |
| 3,020,774 | 2/62 | Kullmann | 74—157 X |
| 3,036,474 | 5/62 | Perez | 74—118 |
| 3,078,732 | 2/63 | Schacht et al. | 74—157 X |
| 3,107,544 | 10/63 | Nichols et al. | 74—157 |

RAPHAEL M. LUPO, *Primary Examiner.*